E. A. ZORSCH.
PROFILE AND CROSS SECTION PLOTTERS.
APPLICATION FILED JUNE 13, 1913.
1,083,421.
Patented Jan. 6, 1914.
3 SHEETS—SHEET 1.
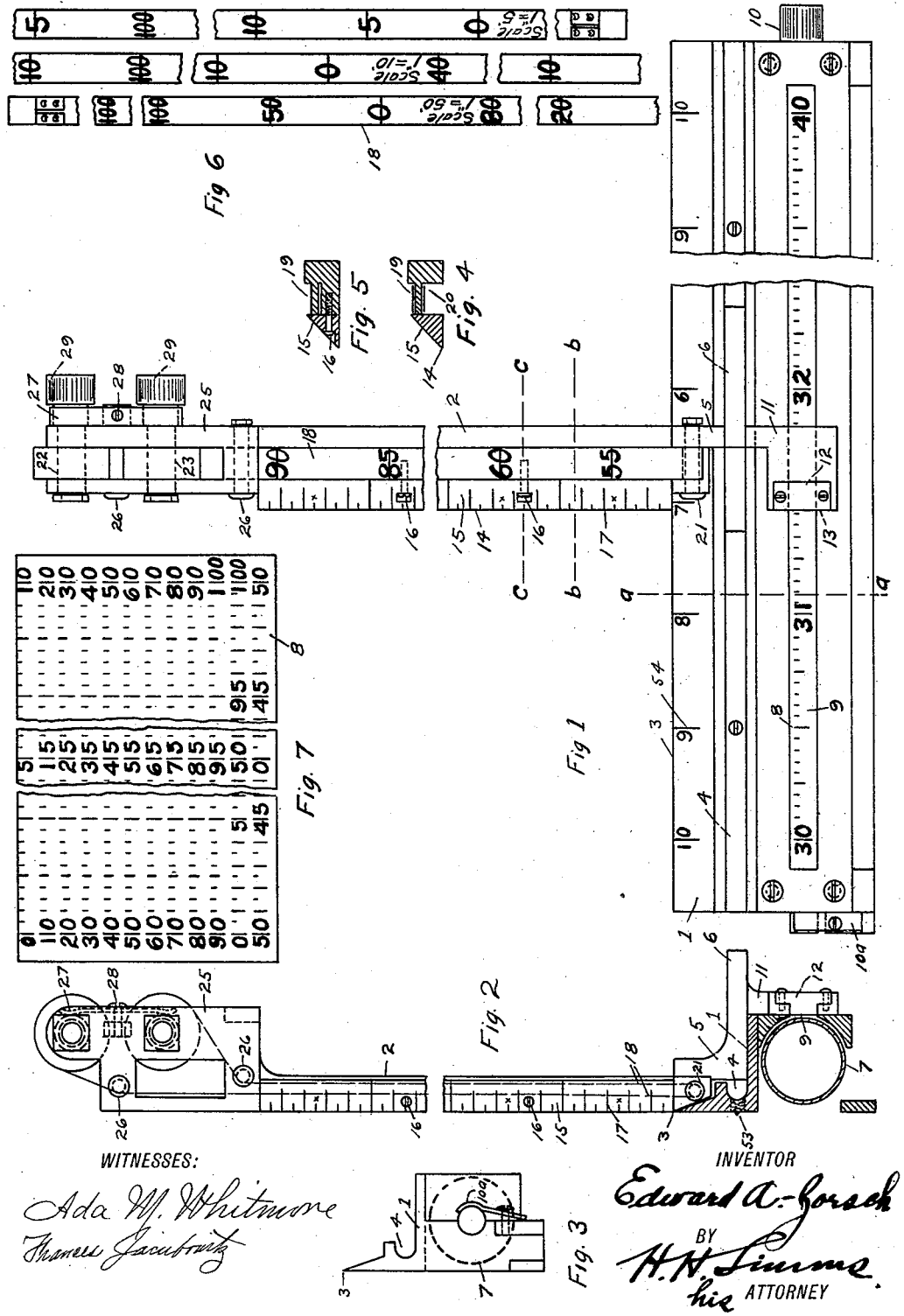
WITNESSES:
Ada M. Whitmore
Thomas Jacubowitz
INVENTOR
Edward A. Zorsch
BY
H. H. Simms
his ATTORNEY
COLUMBIA PLANOGRAPH CO., WASHINGTON, D. C.

E. A. ZORSCH.
PROFILE AND CROSS SECTION PLOTTERS.
APPLICATION FILED JUNE 13, 1913.
1,083,421.
Patented Jan. 6, 1914.
3 SHEETS—SHEET 2.
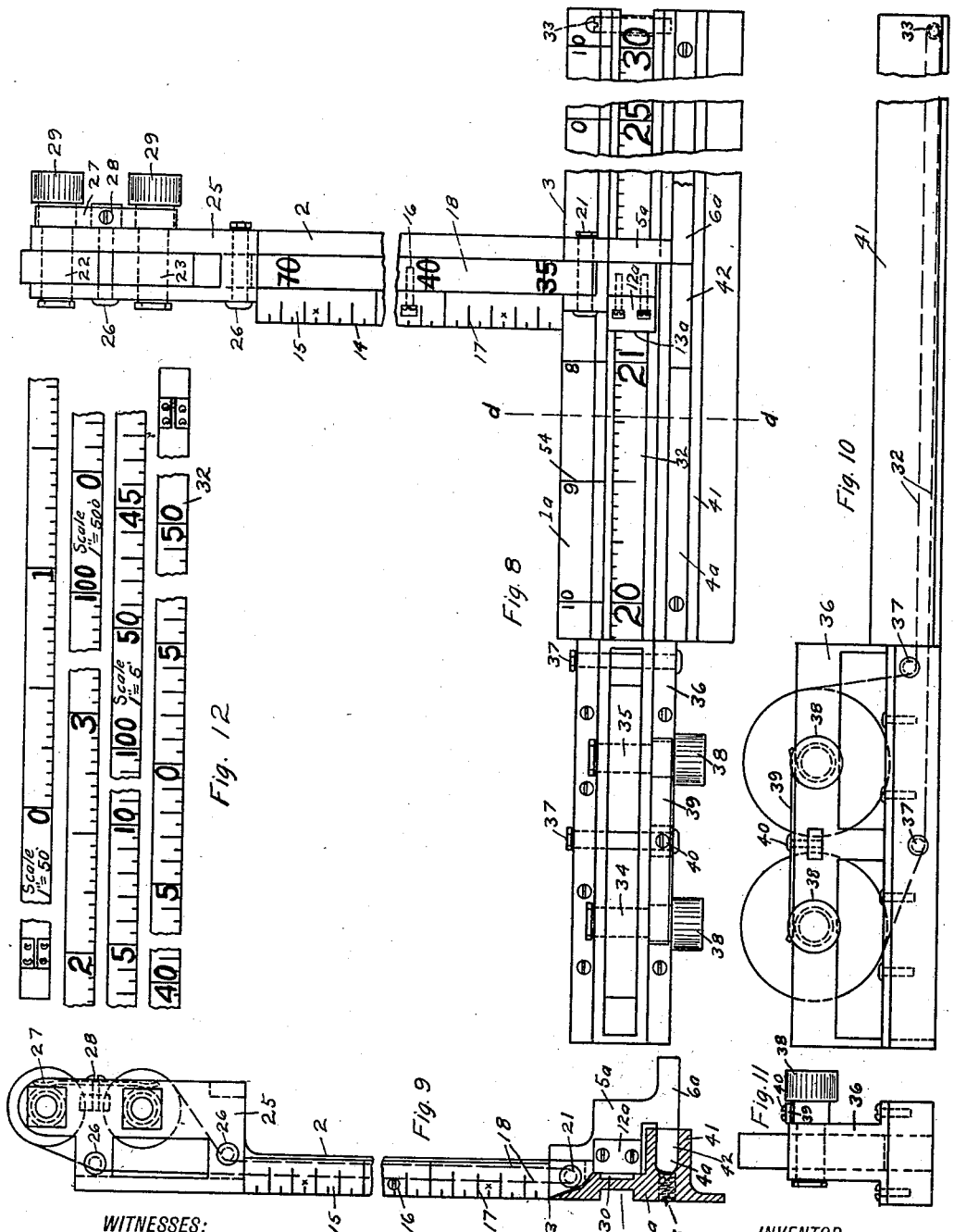

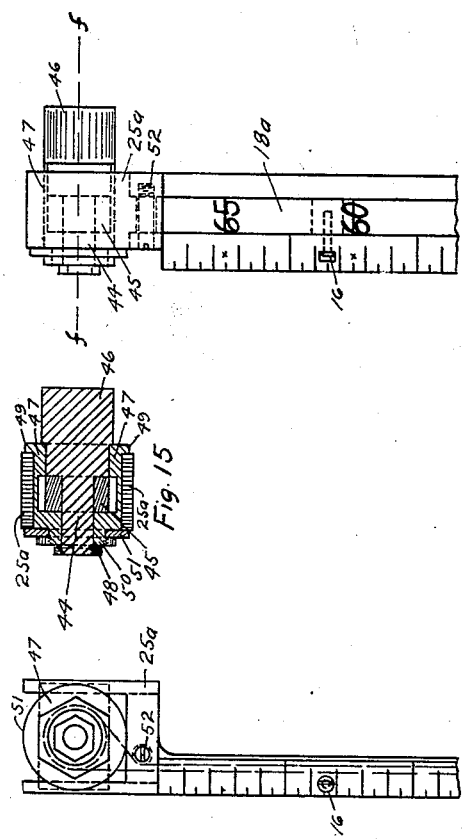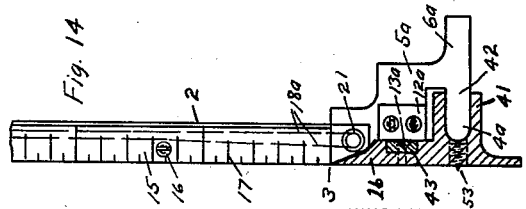

UNITED STATES PATENT OFFICE.

EDWARD A. ZORSCH, OF ROCHESTER, NEW YORK.

PROFILE AND CROSS-SECTION PLOTTERS.

1,083,421. Specification of Letters Patent. Patented Jan. 6, 1914.

Application filed June 13, 1913. Serial No. 773,384.

*To all whom it may concern:*

Be it known that I, EDWARD A. ZORSCH, of Rochester, in the county of Monroe and State of New York, have invented a new and useful Improvement in Profile and Cross-Section Plotters, which improvement is fully set forth in the following specification and shown in the accompanying drawings.
The present invention relates to an instrument for simultaneously determining the rectangular coördinates of any point, and is to be used more particularly for plotting and checking cross sections and profiles of railroad, roadway or other similar work.

As it is well known, in railroad and other road work, it is customary to make profiles or cross sections of the surface of the earth where the road is to be cut. This is usually done on what is called profile or cross section paper consisting of a sheet of paper having its surface divided up into a number of small squares by crossing lines, the distance between any two lines representing a certain number of feet or miles, thus permitting the sketching or drawing of the profile or cross section of the earth in a short space of time.

Heretofore, a great deal of trouble has been experienced because the draftsman, in making the profile or cross section, or because the party checking such profile or cross section would fail to count properly the spaces and as each space represents in some instances quite a number of feet, this error becomes very important, as estimates for excavation are based on these profiles or cross sections and the error of even a few feet either way might materially affect such estimate. It has been impractical to provide numbers for the lines of the profile or cross section sheets as these numbers would not only be in the way but they could not be used for all kinds of work because the datum line varies with different work.

The purpose of this invention is to provide an instrument which may be adjusted to correspond to the height of the datum line and which will eliminate the heretofore serious errors by indicating the lines on the profile or cross section sheet at which the profile or cross section is to be marked. In fact, the profile or cross section may be drawn on paper without the profile lines.
The instrument may also be used for taking measurements or checking from previously drawn profiles or cross sections.

To these and other ends the invention consists in certain parts and combinations of parts all of which will be hereinafter described, the novel features being pointed out in the appended claims.

In the drawings: Figure 1 is a plan view of an instrument constructed in accordance with the present improvements; Fig. 2 is a section on the line *a—a*, Fig. 1; Fig. 3 is an end view of the base member; Fig. 4 is a section on the line *b—b*, Fig. 1; Fig. 5 is a section on the line *c—c*, Fig. 1; Fig. 6 is a detail view showing fragments of the tape employed in this embodiment; Fig. 7 is a development of fragments of the cylinder arranged in the base member; Fig. 8 is a plan view of another embodiment of this invention; Fig. 9 is a section on the line *d—d*, Fig. 8; Fig. 10 is a rear view of the base member; Fig. 11 is an end view of the base member; Fig. 12 is a detail view of fragments of the tape used in the base member of this embodiment of the invention; Fig. 13 is a plan view of still another embodiment of the invention; Fig. 14 is a section on the line *e—e*, Fig. 13; and Fig. 15 is a section on the line *f—f*, Fig. 13.

Referring to the embodiment shown in Figs. 1 to 7, 1 indicates a base member and 2 an arm extending at right angles to the base member and guided longitudinally of the latter. Preferably, the base member has a straight edge 3 and is formed with a longitudinally-extending guide or way in the form of a groove 4 extending longitudinally of the base member and parallel with the straight edge 3. Arranged to operate on the guide is a block 5 to which the arm 2 is secured, said block being extended upwardly at 6 to form a finger piece through which said block and the arm 2 are moved.

Mounted on the base or guide member 1 is an adjustable scale member which preferably is in the form of a drum 7 having a sheet of celluloid or other suitable material 8 adhesively or otherwise secured thereto and provided with a plurality of suitable scales. In this instance, the drum has twelve scales, the first scale having indications from one to ten stations of one hundred feet each, the second from ten to twenty and so on up to ninety to one hundred. In addition to the above scales, a scale is provided with indications for every five stations of one hundred feet each up to one hundred and another scale is provided with zero at the center thereof and indications for every five feet up to fifty on opposite sides of the zero mark all of which will be seen by referring to Fig. 7 of the drawings, this latter scale being more particularly designed for cross section work. The drum 7 may be mounted within the casing 1 on the rear side of the guide 4, and the casing 1 is provided with a longitudinal slot or view opening 9 through which any one of the above scales may be viewed, the drum being rotatable by a finger piece 10 at one end of the body casing 1 to present any one of the scales to the view opening and a spring $10^a$ being arranged at the outer end of the base member to produce friction on the shaft of the drum and thus prevent the too free movement of the latter.

The lateral extending arm 2 carries with it an index for coöperation with the exposed scale on the base member, the index, in this instance, being in the form of an arm which extends from the rear side of the upright member 5 over the view opening 9 and carries a transparent or celluloid block 12, the edge 13 of which forms the index for coöperating with the scales on the drum 7. The arm 2 is provided with a straight edge 14 which alines with the index or edge 13. The straight edge 14 is in the form of a piece of celluloid 15 of triangular cross section secured to the arm 2 by screws or other fastenings 16 and having suitable but uncharacterized graduations 17 thereon. The laterally-extending arm also carries an adjustable scale which in this, instance, is in the form of a tape 18 shown in fragments in Fig. 6 and having suitable divisions thereon, said tape having any desired number of scales for securing the desired results. The arm 2 is preferably provided with grooves or ways 19 and 20 on opposite sides thereof for the reception of the tape 18, the latter being passed about a loosely journaled pin or guide 21 at the inner end of the arm and having its opposite ends secured to two rollers 22 and 23 at the outer end of the arm, said rollers being journaled in a frame 25 which also carries idlers 26 for guiding the tape in the grooves 19 and 20. A spring 27 secured at 28 between its ends, bears on the shafts of the rollers 22 and 23 and frictionally holds them against accidental movement. Thumb pieces 29 may be provided on the shafts of the rollers to shift the tape 18.

A description of the use of this instrument in checking profiles and cross sections will indicate its use in plotting them.

In checking a profile, with the instrument shown in Figs. 1 to 7, the straight edge 3 of the base member is placed on the first datum line, below the lowest point of the profile. Assume the lowest point has an elevation of $752\frac{1}{2}$ feet, and that the profile sheet has divisions in which the vertical distance between two lines is equal to one foot and one inch thereon equals five feet. The first datum line below would be 750. The tape 18 is adjusted so that 50 thereon, in that section where the scale reads 1″—5′ will exactly coincide with the straight edge 3, the 700 being eliminated from consideration so far as the instrument is concerned. The adjustable scale 7 which is used for horizontal measurements is turned so that the desired scale thereon is viewable through the opening 9. Assume that the starting point or station is thirty-one hundred feet from a certain point, the scale member 7 is turned so that the scale, beginning with 30, is viewable through the opening 9. The slide arm 2 is now moved until its index edge 13 registers with the point 31 on the scale member 7 and in that position the whole instrument is shifted horizontally until the straight edge 14 engages the starting point. The height of the profile is checked by reading the scale 18 in connection with scale 17. The slide arm 2 is now moved to the right, assuming that the station's increase is in that direction, until the straight edge 14 coincides with the next point to be checked. This movement can be continued until the slide 2 reaches the right hand end of the guide or base member 1 and until the vertical dimensions of the profile reach the limits of the scale 17. If it is desired to move the slide arm 2 beyond the point 40, the scale member 7 is turned to bring the next scale, beginning with 40, in view, and the base or guide member 1 is shifted bodily to bring this 40 to the position of the previous 40, the slide arm 2 also being shifted to the left hand end of the base or guide member and the checking continued until finished. If the datum line should begin at any other number the tape 18 may be shifted to bring the desired number into coincidence with the straight edge 3. The tape 18 carries a number of scales in which the divisions of one inch thereon are equal to other numbers of feet so that the scale is adapted for large or small work. On the scale 8, one inch represents a greater distance than on the scale 18 but this is customary in making profiles as it gives a more clearly defined view of the profile. For cross section work the last scale on the cylinder 7 is used as, in this instance, measurement is taken from the center line of the road.

In the embodiment of the invention shown in Figs. 8 to 12, instead of employing an adjustable scale member in the form of a drum, such scale member is in the form of an adjustable tape similar to the adjustable tape used on the sliding arm of the hereinbefore described embodiment and suitably graduated. The sliding arm 2 is the same as in Fig. 1 as are also the tape 18, pulleys 22 and 23 and the coöperating parts. The connection of the sliding arm with the base or guide member 1ª is different, this being due to the employment of tape instead of a rotary drum on the guide member. In this embodiment, the guide member is provided with grooves 30 and 31 in opposite faces thereof for the reception of the tape 32, the latter being passed about a roller 33 at one end of the guide member 1ª and being secured at its opposite ends to rollers 34 and 35 on the frame 36 at the opposite end of the guide member 1ª. The rollers 34 and 35 are provided with thumb pieces 38 and are held frictionally by a spring 39 secured midway between its ends at 40 and bearing upon said rollers. Fragmentary portions of the tape 32 are shown in Fig. 12. The tape has advantages over the drum in that a greater number of scales may be provided thereon of a suitable size and it is possible to adjust the scales to begin with fractions of the decades without shifting the base member 1ª which is impossible with the rotary drum. This arrangement also permits the scale to be brought closer to the straight edge 3 and, for this reason, the guiding connection between the sliding arms and the base or guide member is different, the latter being provided with a longitudinal groove 4ª in an upstanding portion 41 for receiving a guide piece or rib 42 which is carried by the block 5ª to which the arm 2 is secured, said block also having a finger piece 6ª by which the slide arm is shifted and carrying the index 13ª. This connection between the slide arm and the guide member permits the disconnection of the parts while rigidly holding them in their sliding relation which is also true of all the illustrated embodiments. The operation of this construction is substantially the same as that shown in Fig. 1 except that the tape can be more easily adjusted.

In the embodiment shown in Figs. 13 to 15, the construction is designed only for cross section work and, for this reason, the base member is not provided with an adjustable scale and the sliding arm is not so long as in the other embodiments since only one scale of measurements appears thereon. Referring more particularly to this embodiment, 1ᵇ indicates the base member provided with a straight edge 3 and a longitudinally-extending groove or way 4ª which is similar in construction and arrangement to the way on the embodiment shown in Fig. 8, the way being formed in an upstanding portion 41 and receiving a guide piece 42 on the block 5ª, said block having a finger piece 6ª carrying the index 13ª. The index moves over the scale 43 which is preferably in the form of a strip of celluloid countersunk in the base member and having divisions thereon with suitable characters for cross section work. In this instance, one inch on this scale represents five feet and the zero point on the scale is at the center thereof and the characters increase from said zero point to the opposite ends of the base member.

The arm 2, which is secured to the block 5ª, is the same as in the other embodiments except that the tape 18ª is endless and is shifted in a different manner. The shifting means is arranged on a frame 25ª at the outer end of the arm and is in the form of a single roller about which the tape is passed. This roller is shown in section in Fig. 15 and comprises a spindle 44 having a surrounding rubber collar 45 and a projecting thumb piece 46. The spindle turns within an adjustable bearing piece 47 and is held in the latter by a nut 48. The bearing piece 47 is adjustable on the frame 25ª in the direction of the length of the arm 2 and, to this end, the frame 25ª is bifurcated and receives the externally squared bearing 47 between the arms of the bifurcation, said bearing being provided with shoulders 49 at one end to coöperate with one side of the frame and with a nut 50 at the other end to bear against the washer 51 which coöperates with the other side of the frame. To adjust the roller, the nut 50 is loosened permitting the bearing 47 to be shifted within the bifurcated portion of the frame 25ª to take up or let out the endless scale tape 18ª which passes about the rubber collar 45, the latter producing a necessary friction thereon and the side walls of the bearing being slotted for the passage of the tape. A guide 52 may be provided on the frame 25ª for the tape.

In cross section work, it is customary to employ the center line of the road as a base of measurement, the cross sections being developed with relation to this center line. The base member in this embodiment has divisions extending in opposite directions from the center of the base member, and these divisions, owing to the fact that the widths of the roads are small, are arranged on a rigid or non-adjustable scale member.

In all of the illustrated embodiments of this invention, there is provided a base member formed with a longitudinally extending scale which, in some instances, is adjustable to obtain a greater range of measurement. This base member has a straight edge and is formed with a guide extending substantially parallel to the straight edge, the latter being placed upon the datum line of the drawing and the guide serving to direct a laterally extending arm along the length of the base member for plotting or checking profiles or cross sections. This laterally extending arm also has an adjustable scale, the divisions of which are caused to bear a certain relation to the straight edge of the base member thus determining the vertical position of a point and an index on the adjustable arm coöperates with the scale on the base member for determining the horizontal position of a point.

All embodiments of the invention also have the base member provided with pointed projections 53 on the under face thereof to hold the base member against movement and the straight edge of the base member has a scale 54 in proximity thereto with the zero mark at the center and the characters increasing toward the ends of the base member.

What I claim as my invention and desire to secure by Letters Patent is:

1. An instrument of the class described comprising a base member provided with a longitudinally extending scale, an arm extending at right angles to and adjustable longitudinally of said base member, said arm being provided with a longitudinally extending scale and with an index for coöperating with the scale on the base member, the scale on said arm being adjustable and being in the form of a flexible tape.

2. An instrument of the class desecribed comprising a base member provided with a longitudinally extending scale, an arm extending at right angles to and adjustable longitudinally of said base member, said arm being provided with a longitudinally extending scale and with an index for coöperating with the scale on the base member, the scale on said arm being adjustable and being in the form of a flexible tape and a pair of rollers each secured to one end of the tape.

3. An instrument of the class described comprising a base member provided with a longitudinally extending scale and a longitudinally extending way, an arm extending at right angles to the base member and having a portion coöperating with the way on the base member and also having an index for coöperating with the scale on the base member, a tape provided with a scale, a guide roller near the inner end of the arm about which the tape is passed, and means at the outer end of the arm for shifting the tape.

4. An instrument of the class described comprising a base member provided with a longitudinally extending scale and a longitudinally extending way, an arm extending at right angles to the base member and having a portion coöperating with the way on the base member and also having an index coöperating with the scale on the base member, a guide at the inner end of the arm, a tape provided with a scale and passed about the guide to extend longitudinally of the arm, and a pair of rollers at the outer end of the arm for shifting the tape.

5. An instrument of the class described comprising a base member provided with a longitudinally extending scale, a longitudinally extending way, and a longitudinally extending straight edge, and an arm extending from that side of the base member provided with the straight edge, said arm lying at right angles to the base member and having a longitudinally extending straight edge which has uncharacterized graduations thereon and a portion coöperating with the longitudinally extending way on the base member and also having an index for coöperating with the scale on the base member said arm carrying an adjustable scale containing characters arranged to coöperate with the uncharacterized graduations to give value to the scale on the arm.

6. An instrument of the class described comprising a base member provided with a longitudinally extending scale, a longitudinally extending way and a longitudinally extending straight edge, an arm extending at right angles to and from that side of the base member which is provided with the straight edge, said arm being provided with a straight edge and carrying means for coöperating with the way on the base member and also carrying an index for coöperation with the scale on the base member, a guide at the inner end of the arm, a tape scale passed about said guide and extending longitudinally of the arm, and means at the outer end of the arm for shifting the tape scale to cause the divisions thereof to bear a predetermined relation to the straight edge on the base member.

7. An instrument of the class described comprising a base member provided with a longitudinally extending way and a longitudinally extending straight edge, an adjustable scale member arranged on the base member with its scales extending longitudinally of the base member, an arm extending at right angles to and from that side of the base member which is provided with a straight edge having uncharacterized graduations thereon, said arm having a straight edge and carrying a portion for coöperating with a longitudinally extending guide and an index for coöperation with the scale on the base member, and an adjustable scale member carried by the arm containing characters arranged to coöperate with the uncharacterized graduations to give value to the scale on the arm.

8. An instrument of the class described comprising a base member provided with a longitudinally extending guide and a longitudinally extending straight edge, a cylinder rotatable on the base member about an axis extending parallel with the straight edge, said cylinder being provided with longitudinally extending scales, any one of which may be brought to operative position, an arm extending at right angles to and from that side of the base member which is provided with a straight edge, said arms being provided with a straight edge and carrying a portion coöperating with the longitudinally extending guide on the base member and an index for coöperating with the scale on the base member, a guide on the inner end of the arm, a pair of rollers at the outer end of the arm and a tape scale having its ends connected to the rollers, said tape being passed about the guide and adapted to have its divisions assume different relations to the straight edge of the base member.

EDWARD A. ZORSCH.

Witnesses:
HAROLD H. SIMMS,
ADA M. WHITMORE.

Copies of this patent may be obtained for five cents each, by addressing the "Commissioner of Patents, Washington, D. C."